United States Patent [19]

Calvin et al.

[11] Patent Number: 4,543,993
[45] Date of Patent: Oct. 1, 1985

[54] POSITIVE LOCKING CONNECTOR

[76] Inventors: John H. Calvin, 178 Santa Elena La., Santa Barbara, Calif. 93108; Jack Y. Wakasa, 4025 Michael Ave., Los Angeles, Calif. 90066

[21] Appl. No.: 481,672

[22] Filed: Apr. 4, 1983

[51] Int. Cl.⁴ .............................................. F16L 29/00
[52] U.S. Cl. ........................... 137/614.03; 137/614.01; 137/614; 285/93; 285/316
[58] Field of Search ...................... 285/81, 86, 92, 93, 285/313, 316; 251/149.4, 149.5; 137/614, 614.03, 614.04, 614.01; 403/1; 411/1, 6, 7

[56] References Cited

U.S. PATENT DOCUMENTS

| | | | |
|---|---|---|---|
| 2,892,991 | 6/1959 | Beebee et al. | 285/93 X |
| 2,934,359 | 4/1960 | Smisko et al. | 137/614.03 X |
| 2,983,526 | 5/1961 | Abbey et al. | 137/614.04 |
| 3,218,025 | 11/1965 | Abelson et al. | 285/86 X |
| 3,224,728 | 12/1965 | Buseth et al. | 137/614.03 X |
| 3,267,963 | 8/1966 | Hupp | 137/614.04 |
| 3,587,032 | 6/1971 | Normann | 285/316 X |

Primary Examiner—Alan Cohan
Assistant Examiner—John C. Fox
Attorney, Agent, or Firm—Koppel & Harris

[57] ABSTRACT

A connector for connecting together two ends of a fluid-carrying line comprises two coupling halves. The female half includes a cylindrical female housing. A support sleeve is concentric with and mounted around part of the female housing, and the forward end is threaded to receive the male half. An actuator sleeve is around the support sleeve. A movable locking member in the form of balls are seated in opening through the support sleeve against the actuator sleeve. A trigger ring inside the support sleeve slides between a blocking position under the balls and an unblocking position releasing the balls. One surface of the actuator sleeve urges the balls against the trigger ring. The threaded forward end of the male half engages the threads of the female half. A nose section on the male half, which extends forward of the threads, engages a trigger actuator ring in the female half. The trigger actuator moves the trigger ring to the unblocking position permitting the balls to move inward to engage groves around the outside of the nose member. Movement of the trigger actuator allows fluid flow when the male member moves. When the two halves are apart the balls seat in pockets on the actuator sleeve so that the actuator and support rotate together. When the balls move inward against the nose, the actuator slides to release the balls from the pockets, which allows the actuator to rotate relative to the support.

22 Claims, 10 Drawing Figures

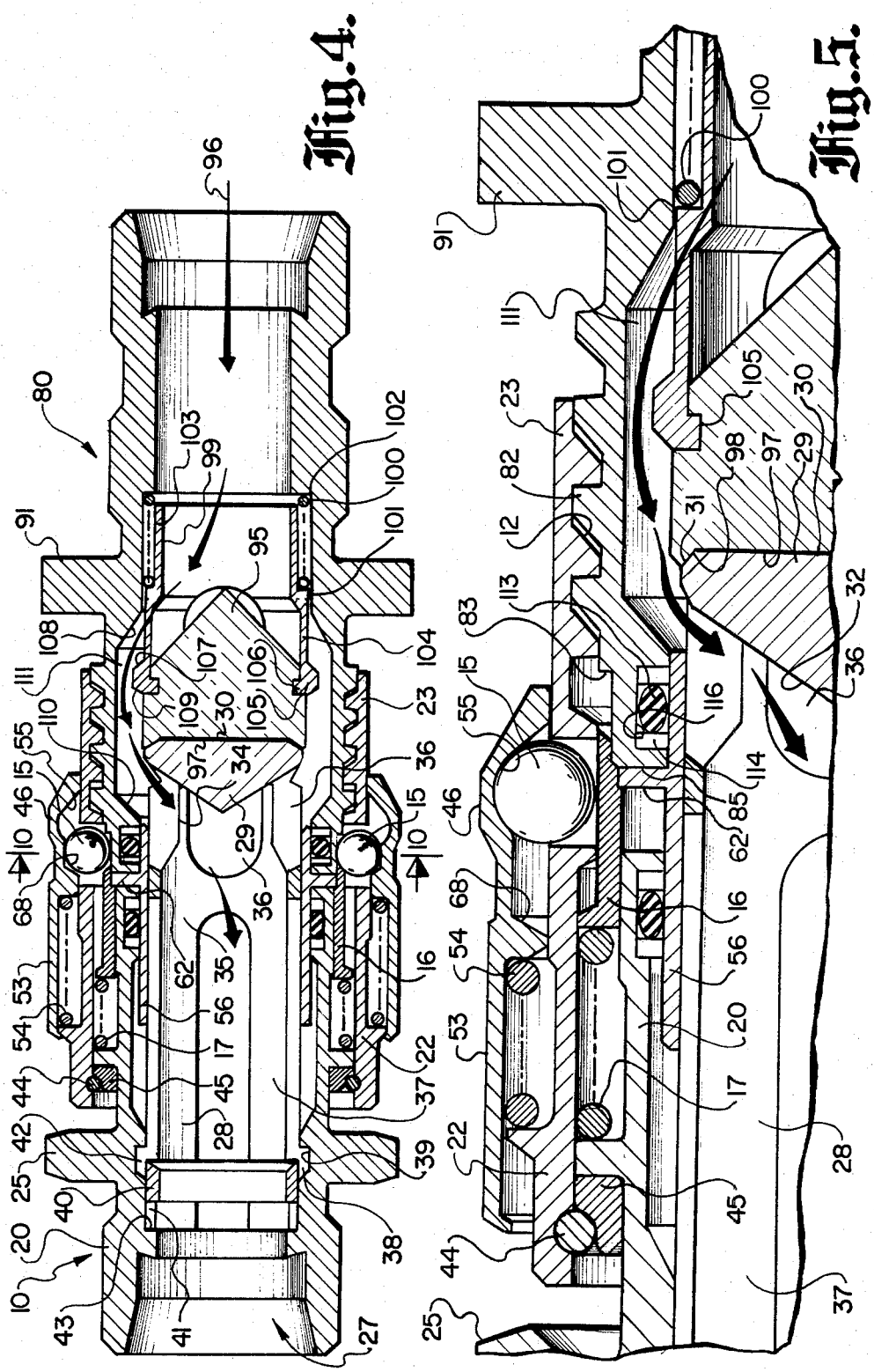

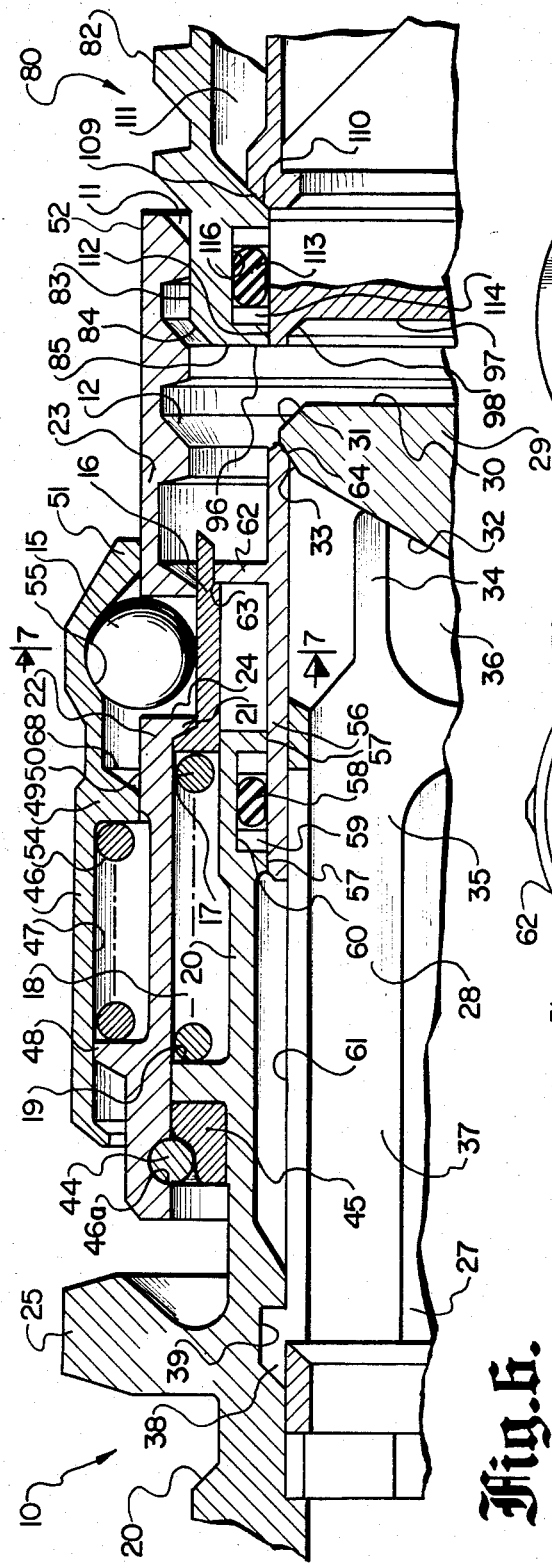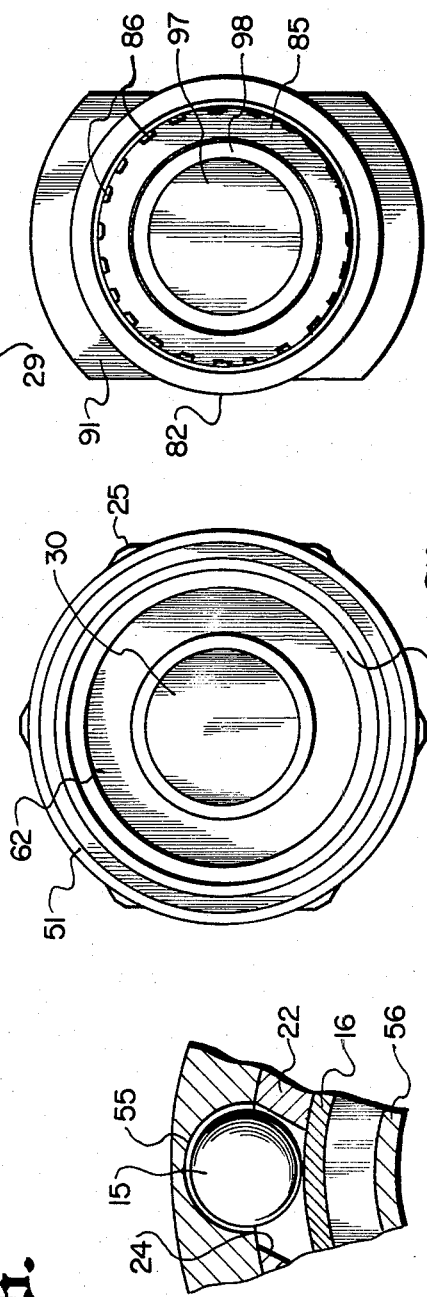

POSITIVE LOCKING CONNECTOR

BACKGROUND OF THE INVENTION

1. Field of the Invention

This invention relates to a fluid connector that is positively locked and that indicates that it is locked.

2. Description of the Prior Art

There are essentially two standard ways of connecting fluid couplings—screw couplings and bayonnet couplings. With bayonnet couplings, the male and female members are oriented to a predetermined relationship, forced together and then rotated relative to each other to a locking position. This forcing together and turning frequently must open internal valves that prevent the flow of hydraulic fluid or air from the respective hydraulic or pneumatic line. Where there is high pressure in one or both lines, coupling is difficult because one must often exert substantial axial force for coupling with both hands. During the coupling operation, the valve may open slightly allowing leaking especially if the coupling operation is not correctly completed.

In the screw fitting, the female member is threaded onto the male member. One problem with threaded couplings is that there is no positive lock. That is, vibrations or incomplete threading can rotate one of the members relative to the other resulting in a partial separation of the coupling members. This frequently results in leaking and pressure loss. There is a tendancy to overtighten the coupling to prevent uncoupling, but overtightening can lock the connectors together and make them inseparable. The opposite tendency is also possible. That is, when it becomes difficult to thread the members further, one may believe that they are fully coupled.

SUMMARY OF THE INVENTION

It is an object of the present invention to overcome the drawbacks of screw couplings and bayonnet couplings. Specifically, it is an object of the present invention to disclose and provide a coupling that has a mechanical advantage during mating that locks together when fully coupled and that cannot be unintentionally uncoupled.

A further object of the present invention is to disclose and provide a coupling that gives visual and touch indications of being fully locked. Another object of the present invention is to disclose and provide a coupling in which uncoupling closes ports on both members without leaking hydraulic fluid or air or allowing air into a hydraulic system.

These and other objects are accomplished by having a female coupling half with a threaded opening that receives a corresponding threaded male coupling half. Locking means on the female half move between an engaged position in which the locking means engages the male half and a disengaged position in which the locking means is out of engagement with the male half. The locking means includes a set of balls, each supported by a trigger when that trigger is in its blocking position, which holds the balls in a position in which they are disengaged from the male half. The threading of the female half onto the male half moves the trigger to allow the balls to move to an engaged position holding the male member from rotating.

An outer sleeve moves axially on the outside of the female half. The balls prevent the actuator sleeve from sliding. When the female half is threaded onto the male half, the front of the male half engages a valve sleeve on the female half which in turn engages the trigger and causes it to slide axially to a position that permits the balls to drop into grooves around the front nose of the male half. The movement of the balls frees the actuator sleeve so it can slide axially under urging from a spring to a locked position in which a portion of the actuator sleeve covers the balls and prevents them from disengaging the grooves on the nose. The engagement of the grooves prevents the female half from being rotated so that the female half cannot be unthreaded from the male half.

When the actuator sleeve slides forward, it covers an indicia or colored band to give a visual indication that the connector is fully engaged. Also, when the halves are fully engaged and the locking balls drop against the nose, the actuator sleeve can rotate freely in either direction without disengaging the halves. Therefore, one knows immediately by sensing the rotation that the halves are fully engaged.

Coupling the halves also opens the various valves permitting hydraulic fluid or air to flow through the coupling.

The drawings and the description that follow explains the operation of the various components of an exemplary embodiment of the invention and will demonstrate how the invention solves the stated objects as well as objects that may become evident during the explanation.

BRIEF DESCRIPTION OF THE DRAWINGS

There are ten figures.

FIG. 2 shows the male and female coupling halves fully coupled, and FIG. 3 shows them apart.

FIG. 4 is a sectional view of the coupling in its assembled view.

FIGS. 5 and 6 are both partial sectional views of this invention in the same plane as the view in FIG. 4. In FIG. 5, the male and female halves are partially coupled, and in FIG. 6, they are fully uncoupled.

FIG. 7 is an end sectional view of this invention taken through plane 7—7 in FIG. 6.

FIG. 8 is an end view of the female coupling half looking through plane 8—8 in FIG. 3.

FIG. 9 is an end view of the male coupling half taken through plane 9—9 in FIG. 3.

DETAILED DESCRIPTION OF THE PREFERRED EMBODIMENT

Figure 1:
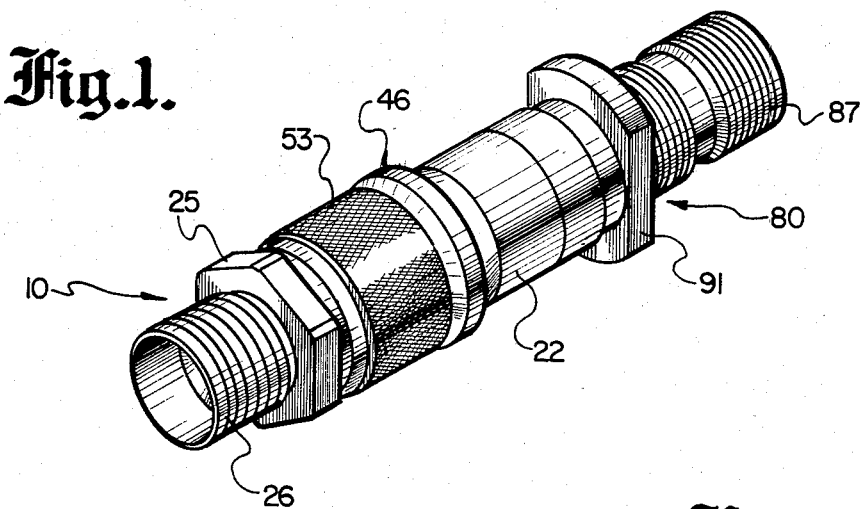
FIG. 1 is a perspective view of the coupling of the present invention.

The positive locking fluid connector of the present invention comprises a female coupling half or coupler 10 and a male coupling half or nipple 80 (FIGS. 1-6). The female coupler 10 includes a generally cyindrical female housing 20 with a support sleeve 22 mounted for rotation around the front (right) part of female housing 20 (FIGS. 2-6). Support sleeve 22 can rotate on housing 20. The forward end 23 of support sleeve 22 has a threaded opening 11 (FIGS. 3 and 6) for receiving threaded end 81 of male coupling half 80. With the exception of some elastamoric or plastic sealing members and a retaining ring, almost the entire structure is formed of passivated stainless steel.

Threads 82 on threaded end 81 of nipple 80 (FIGS. 3-5) and corresponding thread 12 in the open, threaded end 11 of the female coupler 10 are preferably modified buttress threads, which provide a mechanical advantage for connecting and disconnecting large couplings with pressures of more than 50 psi (3.5 kg/cm²). Buttress or modified butress threads are better able to withstand high separating forces while providing better centering of the thread.

Locking means on the female coupling half 10 are movable between an engaged position in which the locking means engages the nipple 80 to a disengaged position in which the locking means is out of engagement with the nipple. In the exemplary embodiment, the locking means comprises a plurality of circumferentially spaced locking balls 15 (FIGS. 4-7 and 10). Although balls 15 are spherical in the exemplary embodiment, their shape can be modified.

Blocking means adjacent the locking means is movable between a blocking position for blocking the locking means from engaging nipple 80 and an unblocking position releasing the locking means to engage the nipple. In the exemplary embodiment, the blocking means comprises trigger 16 (FIGS. 4-7). When the female coupling half 10 and the male coupling half 80 are separated as in FIG. 6, balls 15 are supported by trigger 16 (FIGS. 6 and 7). Trigger 16 is a sleeve that is mounted around female housing 20, extends beyond the forward end of the female housing and is mounted under support sleeve 22 (FIG. 6). Spring 17 (FIGS. 4-6) urges trigger 16 to the right under balls 15. Spring 17 is mounted within a chamber 18 formed by the cylindrical outside of the female housing 20 and outwardly extending flange 19. Support sleeve 22 forms the top of chamber 18. A ridge 21 extends inward from support sleeve 22 to secure trigger 16 in chamber 18 (FIGS. 4-6). Support sleeve 22 has an opening 24 (FIG. 6) that is slanted (FIG. 10) in which balls 15 rest.

The exemplary embediment shows female housing 20 with a standard threaded end 26 (FIGS. 1-4) which is received in a standard fitting or tube. The hex flange 25 permits tightening of female housing 20 to the tube or standard housing by a wrench of appropriate dimensions.

A stop member 28 is mounted inside housing member 20 (FIGS. 4-6). Stop member 28 includes a forward member 29 that has a generally flat forward face 30 mounted in threaded end 11 of sleeve 22. The edge of front face 30 is chamferred at 31. The rear face 32 of forward member 29 is conically shaped, and the angle of the rear face 32 changes at 33. Extensions 34 extend rearward from forward member 29 and connect to the rear member 35 of stop member 28. The space between extensions 34 and between the forward member 29 and rear member 35 leave a plurality of gaps 36 that will provide a path through which hydraulic fluid can flow. The fluid path will be explained in greater detail later.

Arms 37 extend rearward from rear member 35. A ridge 38, formed at the end of arms 37, seats in groove 39 in housing 20. Arms 37 are somewhat resilient, and they are squeezed somewhat during assembly and allowed to expand outward so that ridge 38 will engage slot 39. Forward and rearward retainers 40 and 41, which seat in grooves 42 and 43 respectively, hold ridge 38 in groove 39.

Support sleeve 22 is secured to female housing 20 by means of a wire retaining ring 44 which seats in an aluminum/bronze ring segment 45 and in groove 46a at the rear portion 21 of support member 22 (FIGS. 4-6). The retaining ring 44 and ring segment 45, which retain allow support sleeve 22 to rotate with respect to final housing 20, could be replaced with roller bearings mounted in a suitably shaped race.

Figure 2:
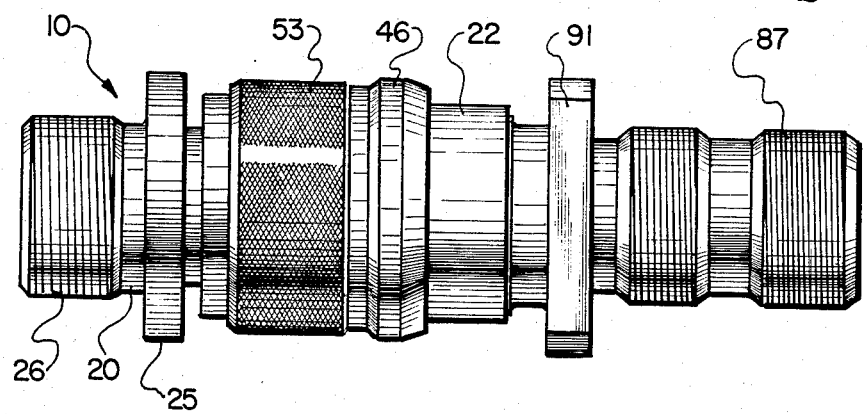
FIGS. 2 and 3 are side elevations of the coupling of the present invention.
Figure 3:
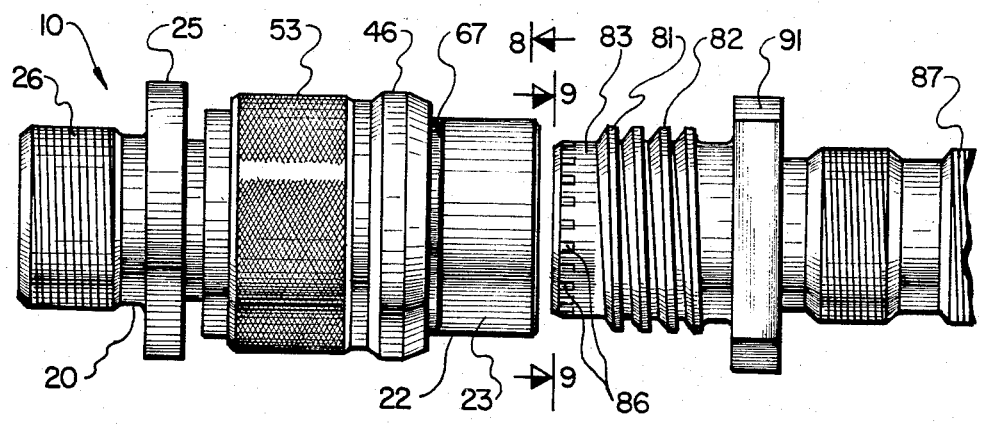

A spring biased, axially moveable actuator sleeve is mounted on the coupler half. In the exemplary embodiment, the actuator sleeve 46 (FIGS. 1-6) is mounted around and is capable of sliding axially on support sleeve 22 (FIGS. 4-6). Inner surface 47 of actuator sleeve 46 slides on ridge 48, inward facing ridge 49 slides on outer surface 50 of support sleeve 22, and forward arm 51 slides on outer surface 52 of the support sleeve 22. Outer surface 53 of actuator sleeve 46 is knurled to assist in gripping it (FIGS. 1-3). Spring 54, which extends between arms 48 and 49, biases actuator sleeve 46 to the right (FIGS. 4-6). The forward portion of actuator sleeve 46 has a circumferential groove 68 foreward of ridge 49, and there are four pockets 55 that intersect groove 68 sized to receive balls 15 (FIGS. 6 and 7).

Balls 15 are within pockets 55 when the female coupler 10 is in its uncoupled state (FIG. 6). Ball 15 is supported on ring-shaped trigger 16, which holds it in pocket 55. When balls 15 are located between trigger 16 and pocket 55, the balls prevents actuator sleeve 46 from moving to the right (FIG. 6) and from rotating relative to support sleeve 22 (FIG. 7), because the bottom portions of balls 15 are held within slanted openings 24 and pocket 55. Therefore, actuator sleeve 46 can be used to rotate support sleeve 22 to thread female coupling half 10 to male nipple 80.

A trigger actuator or valve sleeve 56 is mounted for sliding between the inside surface 57 of female housing 20 (FIGS. 4-6) for actuating trigger 16. An O-ring 58, preferably of elasticmeric material is backed by plastic backup rings 59 in groove 60. The other side of the valve sleeve 56 is supported on the outside surface 61 of stop member 28. Valve sleeve 56 can therefore slide axially back and forth.

Valve sleeve 56 also has an upstanding ridge 62 (FIGS. 4-6) that seats within a groove 63 in trigger 16. When valve sleeve 56 moves to the left (FIG. 5), upstanding ridge 62, through its intersection in groove 63 moves trigger 16 to the left against the bias of spring 17. Likewise, if female coupler 10 and male nipple 80 are uncoupled (FIG. 6), spring 17, urging trigger 16 to the right, urges the valve sleeve 56 to the right.

Figure 10:
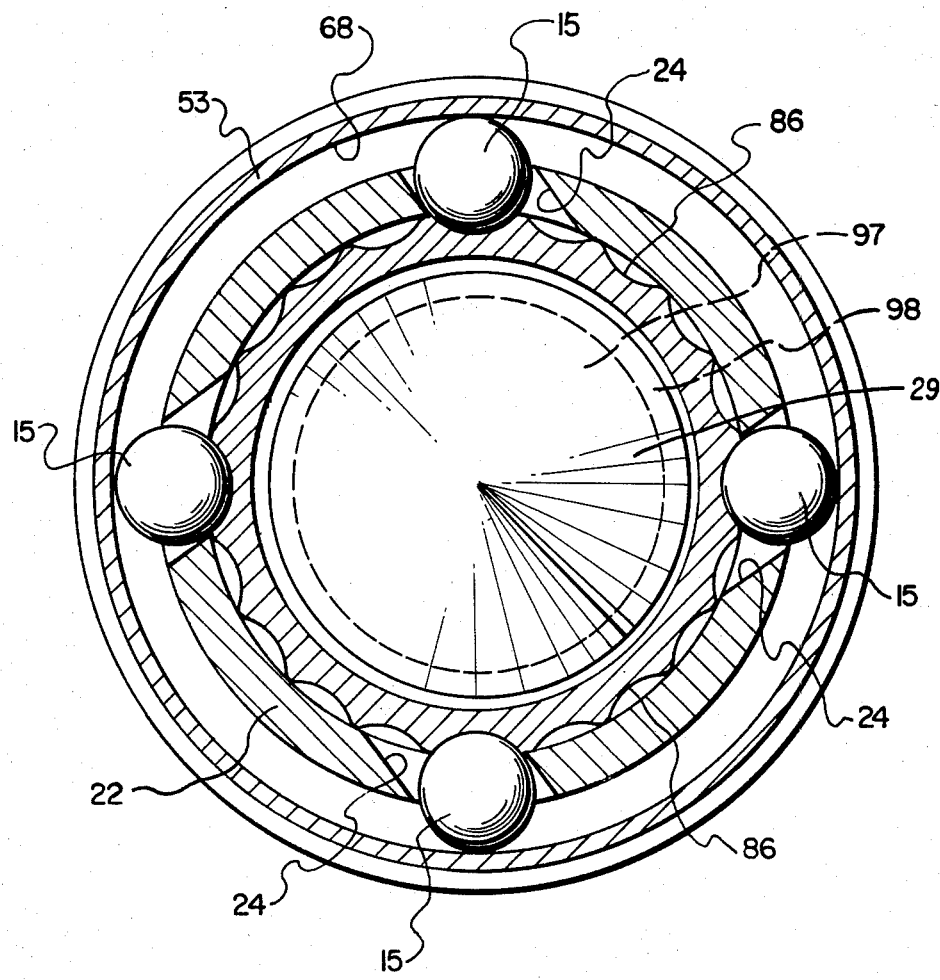
FIG. 10 is a sectional view taken through plane 10—10 in FIG. 4 and showing the engagement of the balls with the front nose of the male half.

When the threaded end 81 of male member 80 is connected to threaded end 11 of support sleeve 22, end face 85 contacts ridge 62 (FIGS. 5 and 6). Continued threading causes end face 85 to move valve sleeve 56 and thus trigger 16 to the left. As shown primarily in comparing FIG. 5 to FIG. 4, when valve sleeve 56 moves trigger 16 to the left, balls 15 can move inward against grooves 86 of nose 83 (FIG. 10). Axial movement of pockets 55 of actuator sleeve 46 to the right urges balls 15 inward.

As shown in FIGS. 4 and 10, the bottoms of balls 15 engage grooves 86. When the balls are held against grooves 86 by groove 68 of actuator sleeve 46, nose 83 and consequently the entire nipple 80 cannot be rotated with respect to the support member 22 so that the nipple 80 cannot be unthreaded from threaded end 11 of female coupler 10. At the same time, because the balls 15 are out of pockets 55, balls 15 seat in circumferential groove 68 when they can roll so that actuator sleeve 46 can now rotate with respect to support sleeve 22. Therefore, one assembling the coupler halves can feel when the members are fully coupled.

As shown primarily in FIGS. 7 and 10, openings 24 are slanted. During the coupling operation, as seen with respect to FIG. 10, support sleeve 22 rotates clockwise with respect to nose 83. The slanting of openings 24 assist balls 15 into grooves 86. If opening 24 were radial or straight sided, grooves 86 would tend to bind balls 15 against the sides of the opening. Also, during uncoupling when the support sleeve 22 is rotating counter clockwise with respect to nose 83 (FIG. 10), the slanted walls of opening 24 guide balls 15 upward out of engagement with the nose to permit rotation of the nose.

Indicia means are also provided on the outer surface of the support for indicating whether the coupler halves are locked. In the exemplary embodiment, a colored band 67 (FIG. 3) is provided on the outer surface 52 of support member 22 immediately adjacent the end of forward arm 51 of actuator sleeve 46. Band 67 is preferably colored red for contrast with the stainless steel of the coupler parts. When the coupling halves are in the locked position and actuator sleeve 46 slides to the right, arm 51 covers colored band 67 so that it is no longer visible. Therefore, one using the coupling has a visual indication that the coupling halves are locked. The visual indication is in addition to the feel of the actuator sleeve 46 being permitted to rotate with respect to the support sleeve 22 when the coupling halves are fully locked.

Nipple 80 also has a second threaded end 87 for connection to a standard hydraulic or pneumatic line which is standard. Male member 80 also has a fitting 91 best shown in FIG. 1 that is formed as part of the housing. Fitting 91 is adapted to be attached to a rigid wall or support for mounting male nipple 80. Generally, nipple 80 will not rotate.

Referring back to FIG. 6, when the male and female coupling halves are not engaged, there can be no hydraulic fluid or air flow through either member. In FIG. 6, flow to the right through central opening 28 that could normally pass through gaps 36 is blocked by valve sleeve 56. The front 64 of valve sleeve 56 conforms to the angled surface 33 of forward member 29 for sealing (FIG. 6).

A poppet 95 closes the front end of opening 96 to seal male coupling half 80. Poppet 95 has a front face 97 and a beveled rim 98. Both conform in shape to flat face 30 and the chamferred side 31 of stop member 28 of the female coupling half 10 (FIGS. 4–6). Poppet 95 is held in place by poppet retainer 99 (FIGS. 4 and 5). Poppet spring 100, which extends between spacer 101 and face 102 (FIG. 4) urges retainer 99 and poppet 95 to the left. Poppet retainer 99 is formed of a cylindrical wall 103 and arms 104 that are generally concentric with cylindrical wall 103. Arms 104 terminate in ridges 105 that engage groove 106 (FIG. 4) on poppet 95. Arms 104 are somewhat flexible to allow them to move outward slightly to engage groove 106. Once in the engaged state, shoulder 107 of arm 104 cannot move beyond the angled side 108 of groove 111 (FIG. 4). Likewise, another shoulder 109 engages angled side 110 of groove 111 when poppet 95 is closed when the two coupling halves are uncoupled (FIG. 6).

When male nipple 80 is in the uncoupled state (FIG. 6), flow of fluid to the left under pressure is blocked by the sealing action of outer surface 112 of poppet 95 against elastocmeric O-ring 113 and plastic backing rings 114 in groove 116. Therefore, when the coupling halves are in their uncoupled state (FIG. 6), both coupling halves 10 and 80 block flow of hydraulic fluid.

When the coupler 10 and nipple 80 are coupled (FIG. 4), fluid in central opening 96 that passes into groove 111 on the inside wall of male coupling half 80 is not blocked by poppet 95 because stop member 28 has engaged poppet 95 and moved it to the right (FIG. 4). Likewise, nose 83 of male coupling half 80 has moved valve sleeve 56 to the left (FIGS. 3 and 4). This permits fluid to flow through gaps 36 in the rear 35 of stop member 28. Thus, fluid follows the path shown by the arrow in FIGS. 4 and 5. The dimensions of groove 111 are chosen such that there is not a substantial decrease in the cross-sectional area of the fluid path in order to minimize the pressure drop over the entire coupling.

The positive locking connector of the present invention operates as follows. Originally, the female coupling half 10 and the male nipple 80 are uncoupled (FIG. 6). Hydraulic fluid is prevented from flowing out of female coupler 10 by the engagement of valve sleeve 56 with the angled base 33 of stop member 28, which blocks the flow of fluid through gaps 36. Likewise, poppet 95 in nipple 80 is sealed by seals 113 and 114 to prevent fluid flow out of the nipple.

To couple the halves together, threads 12 on female coupler 80 are threaded over threads 82 on nipple 80. Note that the threads 82 and 12 engage each other before there is any contact between flat face 30 of stop member 28 and front face 97 of poppet 95 or between ridge 62 of valve sleeve 56 and end face 85 of nose 83 (FIG. 6). Therefore, the initial threading is not impeded, and there is no axial force to make thread engagement more difficult.

As threading continues (FIG. 5), face 30 contacts face 97 so that poppet 95 moves rearward in nipple 80. Fluid flow is prevented, however, until seals 113 and 114 no longer act on poppet 95. The parts are positioned such that this should occur when the threaded engagement of the two coupling halves is sufficiently completed to prevent leakage. Simultaneously, end face 85 of nose 83 engages upstanding ridge 62 of valve sleeve 56 to move the valve sleeve rearward in female coupler 10. This causes the trigger 16 to slide axially rearward against the urging of spring 17. Trigger 16 has moved rearward almost enough to allow balls 15 to move inwardly and engage grooves 86 on nose 83. At this point, the flow path indicated by arrows in FIG. 5 is complete and fluid flows through the connector. However, even though fluid flow has occurred, one connecting the two halves will have received no indication of complete connection. That is, actuator sleeve 46 cannot rotate relative to support sleeve 22, and indicia band 67 is still uncovered.

With additional threading rotation, balls 15 assume their FIG. 4 orientation against grooves 86 on nose 83 under urging by actuator sleeve 46. In the FIG. 4 orientation, the male nipple 80 cannot be rotated relative to support sleeve 22, but actuator sleeve 46 will be free to rotate relative to support sleeve 22. This change gives one an indication that the connectors are fully locked. Also, forward arm 51 of actuator sleeve 46 covers indicia band 67 on the outside 52 of support sleeve 22 to give a visual indication of complete coupling.

The coupling halves cannot be uncoupled unless actuator sleeve 46 is manually moved rearward against urging of actuaror spring 54 so that support sleeve 22 can be rotated relative to male nipple 80. This rotation causes the balls 15 to move out of grooves 86, and the additional unthreading allows trigger and valve sleeve 16 to move forward under urging of valve spring 17. This tends to move balls 15 outward as shown in FIG. 5 toward the configuration shown in FIG. 6 where the halves are uncoupled. During the uncoupling operation, valve sleeve 56 moves forward to seat against stop member 28 to seal central opening 27 in female coupler 10. Also, poppet spring 100 urges poppet 95 forward to seal central opening 96 of male nipple 80. The halves are fully sealed in the FIG. 6 orientation.

Thus, the positive locking fluid connector of the present invention and its method of operation has been explained. The explanation of the invention has been by way of a description of the exemplary embodiment. The scope of the invention, however, extends to the following claims:

We claim:

1. A connector for holding a female coupling half and a male coupling half together comprising:
   threaded means on the male and female coupling halves for moving the male coupling half axially into the female coupling half upon rotation of the coupling halves relative to each other;
   locking means in the female coupling half for engaging the male coupling half in the female coupling half to prevent rotation of the male and female coupling halves relative to each other; and
   blocking means adjacent the locking means, movable between (a) a blocking position for blocking the locking means from engaging the male coupling half and (b) an unblocking position releasing the locking means to engage the male coupling half, a portion of the blocking means being positioned to be contacted by the male coupling half moving axially into the female coupling half, the male coupling half moving the blocking means to the unblocking position when the male and female coupling halves are threaded together.

2. The connector of claim 1, wherein:
   (a) the locking means comprises a plurality of balls mounted in the female coupling half;
   (b) the blocking means comprises trigger means in the female coupling half adjacent the balls for holding the balls in a disengaged position, trigger actuator means in the female coupling half positioned to be contacted by a portion of the male coupling half moving into the female coupling half for moving the trigger means to permit the balls to move to an engaged position engaging the male coupling half.

3. The connector of claim 2, wherein the male coupling half has a cylindrical forward surface positioned under the balls when the male coupling half is fully engaged in the female coupling half, the cylindrical surface having ball receiving means for receiving the balls in their engaged position.

4. The connector of claim 2, further comprising bias means on the female coupling half for urging the balls toward the cylindrical surface of the male coupling half.

5. The connector of claim 4, wherein the bias means comprises a spring biased, axially movable actuator sleeve on the female coupling half having a first surface engaging the balls and urging the balls to the disengaged position against the trigger means when the blocking means is in the blocking position, the balls engaging the actuator sleeve when the trigger means is in the blocking position to prevent axial movement of the actuator sleeve, the actuator sleeve being axially moveable when the balls are in the engaged position, the actuator sleeve having a second surface positioned against the balls when the balls are in the engaged position to hold the balls in the engaged position.

6. The connector of claim 5, wherein the actuator sleeve is mounted on the outside of the female coupling half for manual movement on the female coupling half.

7. The connector of claim 6, further comprising indicia on the female half, the actuator sleeve covering the indicia when the actuator sleeve moves in response to movement of the balls to the engaged position, the actuator sleeve exposing the indicia when the actuator sleeve is prevented from moving axially by the balls in their disengaged position.

8. The connector of claim 5, further comprising indicia on the female half, the actuator sleeve covering the indicia when the actuator sleeve moves in response to movement of the balls to the engaged position, the actuator sleeve exposing the indicia when the actuator sleeve is prevented from moving axially by the balls in their disengaged position.

9. The connector of claim 2, wherein the trigger means is mounted concentric with and radially inside of a support sleeve, the support sleeve having openings through it in which the balls move.

10. The connector of claim 9, wherein the openings through the support sleeve are angled with respect to radii through the opening perpendicular to the axis of the female coupling half.

11. The connector of claim 9, further comprising a spring biased, axially moveable actuator sleeve on the female coupling half concentric with and mounted outside of the support sleeve, the actuator sleeve having pockets of a width slightly greater than the diameter of the balls, the balls in the disengaged position extending into the pockets for preventing rotation of the actuator sleeve relative to the support sleeve.

12. The connector of claim 11, wherein the actuator sleeve comprises a second surface, the actuator sleeve being axially mounted to position the second surface over the balls when the balls are in the engaged position, the second surface being generally cylindrical to permit the actuator sleeve to rotate with respect to the support sleeve when the actuator sleeve moves axially to position the second surface over the balls.

13. The connector of claim 1, further comprising female sealing means on the female coupling half for sealing the female coupling half, the female sealing means being engaged by the male coupling half when the male and female coupling halves are threaded together and moving the sealing means to allow fluid to pass through the female coupling half.

14. The connector of claim 13, wherein the blocking means comprises trigger means in the female coupling half adjacent the balls for holding the balls in a disengaged position, trigger actuator means in the female coupling half positioned to be contacted by a portion of the male coupling half moving into the female coupling half for moving the trigger means to permit the balls to move to an engaged position engaging the male coupling half, the connector further comprising a stop member in the forward portion of the female coupling half, the sealing means being connected to the trigger actuator means and engaging the stop member, the trigger actuating means moving the sealing means out of engagement with the stop member when the male coupling half moves the trigger actuator means.

15. The connector of claim 14, further comprising retainer means attached to the stop member for positioning the stop member in the female coupling half, at least one gap through the retainer means for permitting fluid to flow past the stop means.

16. The connector of claim 14, further comprising poppet means on the male coupling half for sealing the flow of fluid through the male coupling half, the poppet means being positioned for contact by the stop member on the female coupling half when the male and female coupling halves are threaded together to move the poppet means out of sealing engagement to permit fluid flow through the male coupling half.

17. A connector for connecting together two ends of a fluid-carrying line, the connector comprising a male coupling half and a female coupling half for connecting together and for disconnecting from each other, the female coupling half comprising:

a generally cylindrical female housing having a central opening through which fluid can flow, a support sleeve concentric with and mounted around at least a portion of the female housing, the support sleeve having a threaded opening at a forward end, an actuator sleeve concentric with and mounted around at least part of the support sleeve, the support sleeve having at least one opening through it, a moveable locking member in the opening in contact with the actuator sleeve, a trigger ring generally concentric with and mounted inside of the support sleeve and slidable between a blocking position and an unblocking position, the trigger ring in the blocking position being positioned under the locking member, the actuator sleeve having a first surface positioned against the locking member, biasing means for urging the first surface against the locking member to urge the locking member against the trigger ring, a trigger actuator ring, concentric with and positioned inside of the female housing and engaging the trigger ring for sliding the trigger ring to the unblocking position and for being moved by the trigger means when the trigger means returns to its blocking position;

the male coupling half comprising a male housing having a threaded forward end with a nose section extending forward of the threads, the threaded forward end engaging the threads of the support sleeve of the female coupling half, the nose section engaging the trigger actuator ring when the male half is threaded into the female half to move the trigger actuator ring which moves the trigger ring to the unblocking position permitting the locking members to move radially inward to engage the nose section.

18. A connector for holding a female coupling half and a male coupling half together comprising:

threaded means on the male and female coupling halves for moving the male coupling half axially into the female coupling half upon rotation of the coupling halves relative to each other;

locking means in the female coupling half for engaging the male coupling half in the female coupling half to prevent rotation of the male and female coupling halves relative to each other; and blocking means adjacent the locking means, movable between (a) a blocking position for blocking the locking means from engaging the male coupling half and (b) an unblocking position releasing the locking means to engage the male coupling half, a portion of the blocking means being positioned to be contacted by the male coupling half moving axially into the female coupling half, means on the male coupling half moving the blocking means to the unblocking position when the male and female coupling halves are threaded together.

19. The connector of claim 9 further comprising a spring biased axially moveable actuator sleeve on the female coupling half concentric with and mounted outside of the support sleeve, a first surface on the inside of the actuator sleeve in contact with the balls when the balls are in the disengaged position, a second surface on the inside of the actuator sleeve adjacent the first surface in contact with the balls when the balls are in the engaged position, the first and second surfaces having respective inside diameters to prevent the actuator sleeve from moving to a position in which the balls are in contact with the second surface until the balls move to the engaged position.

20. The connector of claim 19 further comprising indexing means between the actuator sleeve and the support sleeve for locking the actuator sleeve and the support sleeve for rotation together in an indexed condition when the balls are in the disengaged position and for permitting rotation of the actuator sleeve relative to the support member when the actuator sleeve is in its non-indexed position when the balls are in the engaged position.

21. The connector of claim 20 wherein the indexing means comprises pockets on the first surface of the actuator sleeve, each pocket having a width slightly greater than the diameter of the balls, the balls in the disengaged position extending into the pockets.

22. A connector for holding a female coupling half and a male coupling half together comprising:

threaded means on the male and female coupling halves for moving the male coupling half axially into the female coupling half upon rotation of the coupling halves relative to each other;

an actuator sleeve on the outside of the female coupling half; and indexing means between the actuator ring and the female coupling half for locking the actuator sleeve to the rest of the female coupling half when the female coupling half and the male coupling half are not fully threaded together and for allowing the actuator sleeve to freewheel with respect to the rest of the female coupling half when the female coupling half and the male coupling half are fully threaded together.

* * * * *